(12) United States Patent
Sun et al.

(10) Patent No.: US 12,117,793 B1
(45) Date of Patent: Oct. 15, 2024

(54) ON-MACHINE REAL-TIME MEASUREMENT METHOD AND SYSTEM FOR FULL-CLOSED LOOP FIVE-AXIS COMPUTER NUMERICAL CONTROL (CNC) MACHINE TOOL

(71) Applicant: DALIAN UNIVERSITY OF TECHNOLOGY, Liaoning (CN)

(72) Inventors: Yuwen Sun, Liaoning (CN); Xiaolong Yin, Liaoning (CN); Hang Gao, Liaoning (CN); Jinting Xu, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 29 days.

(21) Appl. No.: 18/537,413

(22) Filed: Dec. 12, 2023

(30) Foreign Application Priority Data

Apr. 10, 2023 (CN) .......................... 202310373345.0

(51) Int. Cl.
  *G05B 19/39* (2006.01)
  *G05B 19/23* (2006.01)
  *G05B 19/29* (2006.01)

(52) U.S. Cl.
  CPC ............. *G05B 19/39* (2013.01); *G05B 19/23* (2013.01); *G05B 19/29* (2013.01)

(58) Field of Classification Search
  None
  See application file for complete search history.

(56) References Cited

U.S. PATENT DOCUMENTS

| | | | | |
|---|---|---|---|---|
| 2012/0143368 A1* | 6/2012 | Travez | ............... | B23Q 17/0971 |
| | | | | 700/159 |
| 2021/0010831 A1 | 1/2021 | Li et al. | | |
| 2022/0379423 A1* | 12/2022 | Li | ......................... | G05B 19/401 |

FOREIGN PATENT DOCUMENTS

| | | | |
|---|---|---|---|
| CN | 102275093 A | * | 12/2011 |
| CN | 102275093 B | | 3/2013 |

(Continued)

OTHER PUBLICATIONS

Heidenhain, "Evaluation Electronics For Metrology Applications", May 2019, pp. 1-55 (Year: 2019).*

(Continued)

*Primary Examiner* — David Earl Ogg
(74) *Attorney, Agent, or Firm* — MUNCY, GEISSLER, OLDS & LOWE, PC (57) ABSTRACT

The present invention provides an on-machine real-time measurement method and system for a full-closed loop five-axis computer numerical control machine tool. In the system, a high-precision coaxial fixture in a displacement measurement component is used for connecting the component with the machine tool spindle; a multifunctional evaluation electronics box reads the signals of the grating scale of each machine axis in real time, and synchronously triggers the displacement sensor to collect the measured workpiece surface information; a synchronous communication module caches the grating scale signals of each machine axis and the measurement signals of the sensor to the FIFO rotation buffering module of the host computer in parallel to reduce the burden of high-speed transmission; and the host computer performs data processing and coordinate transformation of the grating scale data and the measurement informa- (Continued)

tion in the FIFO module, and finally obtains the three-dimensional geometric information of the measured workpiece surface.

8 Claims, 6 Drawing Sheets

(56) References Cited

FOREIGN PATENT DOCUMENTS

| CN | 106647184 | A | | 5/2017 | |
|---|---|---|---|---|---|
| CN | 106994626 | A | | 8/2017 | |
| CN | 107084662 | A | | 8/2017 | |
| CN | 107726980 | A | | 2/2018 | |
| CN | 107741198 | A | * | 2/2018 | ........... G01B 11/002 |
| CN | 109458969 | A | | 3/2019 | |
| CN | 110500967 | A | | 11/2019 | |
| CN | 111397555 | A | | 7/2020 | |
| CN | 212109915 | U | | 12/2020 | |
| CN | 110587378 | B | | 9/2021 | |
| CN | 114923419 | A | | 8/2022 | |
| JP | 2000258342 | A | | 9/2000 | |

OTHER PUBLICATIONS

Yi, Hongming, "Research on in-machine laser scanning measurement technology of complex curved surfaces," China Excellent Master's Theses Full-text Database, Engineering Science and Technology Series I, Mar. 15, 2017, 71 pages, No. 03.

Chen, Wei, "Research on microstructure processing technology of roller mold based on fast tool servo," China Excellent Master's Theses Full-text Database, Engineering Science and Technology Series I, Jan. 15, 2023, 7 pages, No. 01.

* cited by examiner

Local View in Direction A

ON-MACHINE REAL-TIME MEASUREMENT METHOD AND SYSTEM FOR FULL-CLOSED LOOP FIVE-AXIS COMPUTER NUMERICAL CONTROL (CNC) MACHINE TOOL

TECHNICAL FIELD

The present invention belongs to the field of on-machine measurement and machining integration technology for complex surface structural parts, and more particularly relates to an on-machine real-time measurement method and system for a full-closed loop five-axis computer numerical control (CNC) machine tool.

BACKGROUND

With the continuous development of high-end equipment in the fields of aerospace and energy and power, a large number of large complex surface structural parts with increasingly high performance requirements have emerged, and the requirements for wall thickness and machining surface form accuracy are often extremely stringent. The on-machine precision measurement technology based on five-axis CNC machine tools is an effective method to achieve high-quality and high-efficiency machining and precision evaluation of such structural parts. The general method for on-machine measurement of existing large complex surface structural parts is to install a measurement instrument on the machine tool spindle and carry out vector summing of the machine axis coordinates and the data collected by the measurement instrument to obtain the three-dimensional data of the surface of a structural part. However, the synchronous real-time collection of the position detection device of each machine axis and the external sensor is still a difficult problem to be solved in the field of on-machine measurement.

At present, there are two main ways to acquire the position data of each machine axis in the field of on-machine measurement: one is to read the position of each machine axis through the CNC system of the machine tool, and the other is to directly collect the information from the motor encoder of each machine axis. For example, in the patent "an on-line machining inspection method for a computer numerical control (CNC) system, CN110587378B", the coordinate information of the machine axis is collected by the CNC system, and then the information of external sensors and the coordinate information of each machine axis are sent to the industrial control computer regularly; and in the patent "a workpiece measurement system based on a five-axis computer numerical control (CNC) system, CN102275093B", the motor encoder data of a traditional semi-closed loop five-axis CNC machine tool is read by the external counting device to obtain the machine axis coordinates, and then the industrial control computer periodically reads feedback signals of the encoder and displacement signals of external sensors through the PCI bus. In general, the data acquisition method based on CNC systems is simple to implement. However, due to the finite reading frequency and inherent latency within the CNC systems, ensuring the synchronous real-time data collection of the machine axis positions and the measurement sensors becomes challenging. The data collection mode based on motor encoders can improve the real-time acquisition performance of the machine axis positions to a certain extent, but still does not truly achieve the synchronous correspondence between axis position data and measurement sensor data, and neglects the transmission error of each machine axis. In view of this, it is an effective approach to detect the real position of each machine axis by grating scales on the full-closed loop CNC machine tool, but solely relying on external counting devices for real-time high-speed acquisition and transmission of relevant information often results in loss of some data. Therefore, there is an urgent necessity for the method and system suited for on-machine real-time measurement of full-closed loop five-axis CNC machine tools, so as to meet on-machine precision measurement demands of large complex surface structural parts.

SUMMARY

In view of the above defects and deficiencies in the prior technology, the present invention provides an on-machine real-time measurement method and system for a full-closed loop five-axis computer numerical control (CNC) machine tool, which ensures one-to-one correspondence between the position of each machine axis and the external sensors data by establishing the synchronous interaction of real-time information among the grating scale of each machine axis, the external sensors and the host computer and the First in First out (FIFO) one-way rotation buffering mechanism. And it could solve the problem that it is difficult to realize synchronous real-time collection of the grating scales on the full-closed loop CNC machine tool and the external sensors.

To achieve the above purpose, the present invention adopts the following technical solution:

An on-machine real-time measurement system for a full-closed loop five-axis computer numerical control (CNC) machine tool mainly comprises a displacement measurement component, signal converters, multifunctional evaluation electronics boxes, grating scales, a synchronous communication module and a host computer, wherein:

The displacement measurement component comprises a non-contact displacement sensor and a high-precision coaxial fixture for measuring position points on the workpiece surface, which is installed on the CNC machine tool spindle and can be automatically placed in a tool magazine under the action of a tool changer in the full-closed loop five-axis CNC machine tool.

The grating scales on the full-closed loop five-axis CNC machine tool is connected to a signal converter, and the signal converter routes the grating scale signals in real time to the CNC system and a multifunctional evaluation electronics box used for detection.

The multifunctional evaluation electronics box synchronously reads the signals of the grating scales on the full-closed loop five-axis CNC machine tool in real time, and simultaneously triggers the non-contact displacement sensor in real time to collect the surface information of the measured workpiece, wherein the grating scale signals of each machine axis include position signals and timestamp index signals of each axis, and the measurement signals of the sensor include light intensity signals, displacement signals and trigger index signals.

The synchronous communication module caches data packets of the grating scale signals and the measurement sensor signals to an FIFO rotation buffering module of the host computer through TCP/IP in real time and concurrently to reduce the burden of high-speed transmission; and the host computer circularly reads the data in the FIFO rotation buffering module and synchronously sends data confirmation information to the multifunctional evaluation electronics box and the non-contact displacement sensor, so as to form a closed loop of information to ensure one-to-one correspondence between the position of each machine axis and the measurement data. On this basis, the host computer performs data processing and coordinate transformation of the information of the grating scale of each axis and the measurement information, and finally obtains the three-dimensional geometric information of the surface of the measured workpiece.

Further, the non-contact displacement sensor is installed on the high-precision coaxial fixture, the positioning element of the high-precision coaxial fixture is precisely matched with the clamping unit of the machine tool spindle, which can not only effectively eliminate the clamping error, but also be automatically placed in the tool magazine, thereby enhancing both measurement accuracy and efficiency.

Further, each machine axis adopts the grating scale to realize high-precision full-closed loop control. When the grating scale as an incremental grating scale, two channels of incremental signals are output directly through connection of an electrical interface board and the signal converter; and when the grating scale is an absolute grating scale, the absolute grating scale signals are divided into absolute signals and incremental signals by a distributor plate firstly, and the incremental signals are duplicated into two channels of identical incremental signals through the electrical interface board and the signal converter. One channel of incremental signal is merged with the absolute signals to feed back the position data to the CNC system to form a full-closed loop, and the other channel of incremental signal is transmitted to the multifunctional evaluation electronics box for data collection.

Further, the synchronous communication module realizes data transmission and exchange between devices based on a local area network (LAN).

Furthermore, the LAN is constructed through Ethernet switch equipment, wherein the non-contact displacement sensor transmits the measurement signals to the Ethernet switch equipment through Ethernet/IP, the multifunctional evaluation electronics box transmits the grating scale signals of each axis to the Ethernet switch equipment through Ethernet/IP, and the host computer is connected with the Ethernet switch equipment as terminal equipment to perform data reading through the FIFO rotation buffering module.

Further, the FIFO rotation buffering module caches continuous data streams based on an FIFO memory, which prevents the host computer from losing data during reading and storing operations, reduces the computational burden of the host computer CPU and improves the data transmission speed.

Further, the non-contact displacement sensor is a triggered confocal displacement sensor, and the transmission mode of measurement signals of the triggered confocal displacement sensor is optical fiber transmission. The method also applies to other non-contact detection sensors with triggered functions.

Furthermore, the measurement signals of the triggered confocal displacement sensor are synchronously triggered by the multifunctional evaluation electronics box through RS422 signals.

Further, the multifunctional evaluation electronics box is divided into a master multifunctional evaluation electronics box and a slave multifunctional evaluation electronics box for reading and processing the grating scale signals of each axis of the full-closed loop CNC machine tool, and data collection is triggered between the master control box and the slave multifunctional evaluation electronics box through cascade synchronization.

An on-machine real-time measurement method for a full-closed loop five-axis computer numerical control (CNC) machine tool, comprises the following steps:

S1. Setting the external trigger type, the output data type and the trigger index time of the non-contact displacement sensor through the host computer, and setting the operation mode, the sampled signal type, the sampling frequency and the triggering source of the multifunctional evaluation electronics box.

S2. planning a measurement path that maintains the axis direction of the machine tool spindle is the same as the normal direction of the workpiece surface to improve the accuracy of the measurement data. On this basis, generating and importing numerical control (NC) code into the CNC system, and then installing the displacement measurement component on the machine tool spindle, and preparing the whole scanning of the measured workpiece.

S3. Setting the host computer to circularly read data sets of the grating scale signals of each axis and the measurement signals of the sensor in the FIFO rotation buffering module, and carrying out data comparison and data filtering.

S4. According to the results of data comparison and data filtering, synthesizing the position data in the grating scale signals of each axis and the displacement data in the measurement signals of the sensor in the following ways, so as to obtain the geometric information of the measuring point on the measured workpiece surface:

$$p^w = J_m^{-1}((d\Box R_q^t + N_q^t) + T_m)$$

wherein $p^w = [x_p^w\ y_p^w\ z_p^w]^T$ represents the coordinate information of the measuring point on the measured workpiece surface in the workpiece coordinate system, d is the distance signal of the non-contact displacement sensor or the sum of the distance signal and the thickness signal, $N_q^t$ is the relative coordinate $[x_q^t\ y_q^t\ z_q^t]^T$ of the optical zero-point q of the non-contact displacement sensor corresponding to the measuring point relative to the base point of the tool movement axis of the full-closed loop five-axis CNC machine tool, R is the light extraction vector $[i_q^t\ j_q^t\ k_q^t]^T$ of the non-contact displacement sensor corresponding to the measuring point, $T_m$ is a translation matrix composed of the position signals of the grating scales on the full-closed loop five-axis CNC machine tool, and $J_m^{-1}$ is an inverse Jacobian rotation matrix composed of the grating scale position signals on the full-closed loop five-axis CNC machine tool.

S5. Repeating steps S3 and S4 until the end of scanning, and finally obtaining the three-dimensional geometric information of the measured workpiece surface.

S6. Upon completion of the measurement, automatically returning the displacement measurement component to the tool magazine.

Further, the method of data comparison and data filtering is as follows: firstly, the timestamp index of the grating scale signals of each axis is compared with the trigger index of the sensor signals, and removing the axis grating ruler signals and their corresponding sensor measurement signals where the time difference exceeds the sampling period according to the data comparison result; and then the light intensity signals of the sensor are filtered, and deleting sensor measurement signals and their corresponding axis grating ruler signals that fall beyond the light intensity range.

Further, the sampled signals of the multifunctional evaluation electronics box are sinusoidal analog signals or transistor logic (TTL) signals. The sampling frequency is set to a range of 0.05-10 kHz.

Furthermore, when the non-contact displacement sensor is a triggered confocal displacement sensor, the range of light intensity signals is 5%-95%.

The present invention has the following beneficial effects:

The present invention designs a non-contact on-machine real-time measurement system oriented to the field of on-machine measurement and machining integration of full-closed loop five-axis CNC machine tools, and proposes an on-machine real-time measurement method for a full-closed loop five-axis computer numerical control (CNC) machine tool. The high-precision coaxial fixture provided by the present invention adopts a standard tool holder with automatic tool change, which effectively reduces the clamping error between the displacement measurement component and the machine tool spindle, and thus improves the on-machine measurement accuracy and processing efficiency of the CNC machine tool. The present invention uses standard hardware signals to realize real-time synchronous trigger of the grating scale detection device and the displacement sensor, realizes synchronous interaction of real-time information and closed loop of information between devices through the synchronous communication module, and adopts the one-way rotation buffering mechanism based on the FIFO module to reduce the burden of high-speed data transmission, which ensures synchronous real-time collection of the grating scale of each axis of the full-closed loop CNC machine tool and the external sensors and further improves the stability and measurement accuracy of the on-machine measurement system. In addition, the host computer in the present invention utilizes Ethernet/IP communication with better scalability and does not rely on CNC system for data retrieval. This system can be applied to various types of CNC machine tools, demonstrating excellent scalability and portability.

DESCRIPTION OF DRAWINGS

In the figures: 1. full-closed loop cradle-type five-axis CNC machine tool; 2. machine tool spindle; 3. displacement measurement component; 31. bottle grip taper (BT) tool holder; 32. clamp mechanism assembly; 321. base plate; 322. support plate; 33. outlet hole for optical fiber; 34. fixture shell; 341. clamp column; 35. pressure plate; 36. laser beam; 37. confocal displacement sensor; 38. positioning ring; 39. elastic washer; 4. tool magazine; and 5. milling cutter.

DETAILED DESCRIPTION

In order to make the purpose, features, and advantages of the present invention more obvious and understandable, the present invention is further described below with reference to the drawings and in conjunction with specific embodiments, so that those skilled in the art can implement the present invention with reference to the words of the description. The protection scope of the present invention is not limited to the detailed description. Apparently, the embodiments described below are merely part of the embodiments of the present invention, not all of the embodiments. Based on the embodiments in the present invention, all other embodiments obtained by those ordinary skilled in the art without contributing creative labor will belong to the protection scope of the present invention.

In examples, as shown in FIG. 1 to FIG. 5, a non-contact real-time synchronous measurement system for a full-closed loop cradle-type five-axis CNC machine tool mainly comprises a displacement measurement component, a Heidenhain signal converter, a Heidenhain multifunctional evaluation electronics box, grating scales, a full-closed loop cradle-type five-axis CNC machine tool, a synchronous communication module and a host computer.

Figure 1:
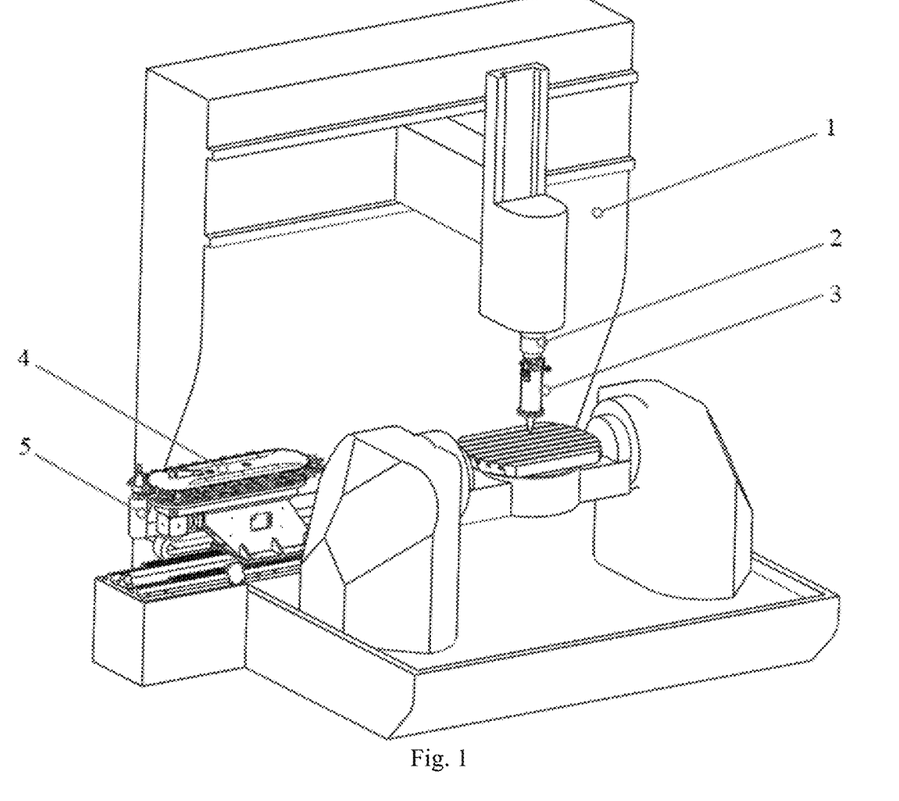
FIG. 1 is a schematic diagram of the overall mechanical structure of an on-machine real-time measurement system.

As shown in FIG. 1, the displacement measurement component is installed on the spindle 2 of the full-closed loop cradle-type five-axis CNC machine tool 1 through a bottle grip taper (BT) tool holder 31 and can be automatically placed in a tool magazine 4 under the action of a tool changer in the full-closed loop cradle-type five-axis CNC machine tool 1. The displacement measurement component 3 shown in FIG. 2 and FIG. 3 comprises a confocal displacement sensor 37 and a high-precision coaxial fixture for measuring the geometric information of the surface of a workpiece. The high-precision coaxial fixture of the sensor mainly comprises a BT tool holder 31, a clamp mechanism assembly 32, a fixture shell 34, a positioning ring 38, a pressure plate 35 and an elastic washer 39, wherein the bottom end of the fixture shell 34 is opened, the middle of 34 is provided with an outlet hole for optical fiber 33, the top end is closed, the external axis of the top end is provided with a clamp column 341, and the clamp column 341 on the top end of the fixture shell 34 is used for ensuring the coaxial connection between the fixture and the BT tool holder 31. The clamp mechanism assembly 32 comprises a base plate 321 and a support plate 322, and the support plate 322 is L-shaped, with one side connected with the side of the fixture shell 34 through screw bolts and the other side provided with a straight flute, as shown in A-directional Local View in FIG. 3. One side of the base plate 321 slides back and forth through matching of the connecting screw bolts and the straight flute of the support plate 322, and the other side is arc-shaped, with a rubber cushion attached on the surface. The base plate 321 is slid to make the rubber on the arc-shaped end of the base plate 321 fit with the surface of the BT tool holder 31. At this time, the connecting screw bolts between the base plate 321 and the support plate 322 in the straight flute are tightened to ensure that the surfaces of the base plate 321 and the BT tool holder 31 are clamped. The base plate 321 and the support plate 322 are used for strengthening the connection between the BT tool holder 31 and the fixture shell 34 and bearing the bending moment caused by the dead weight of the fixture when tilting. The positioning ring 38 and the pressure plate 35 are used for installing and positioning the confocal displacement sensor 37. The optical fiber signal line of the non-contact displacement sensor can be extended from the outlet hole for optical fiber 33 to the synchronous communication module, and the elastic washer 39 can be arranged between the positioning ring 38 and the pressure plate 35. A milling cutter 5 is placed in the tool magazine 4 for milling after the measurement process, so as to realize the on-machine measurement and machining integration of the full-closed loop CNC machine tool.

Figure 4:
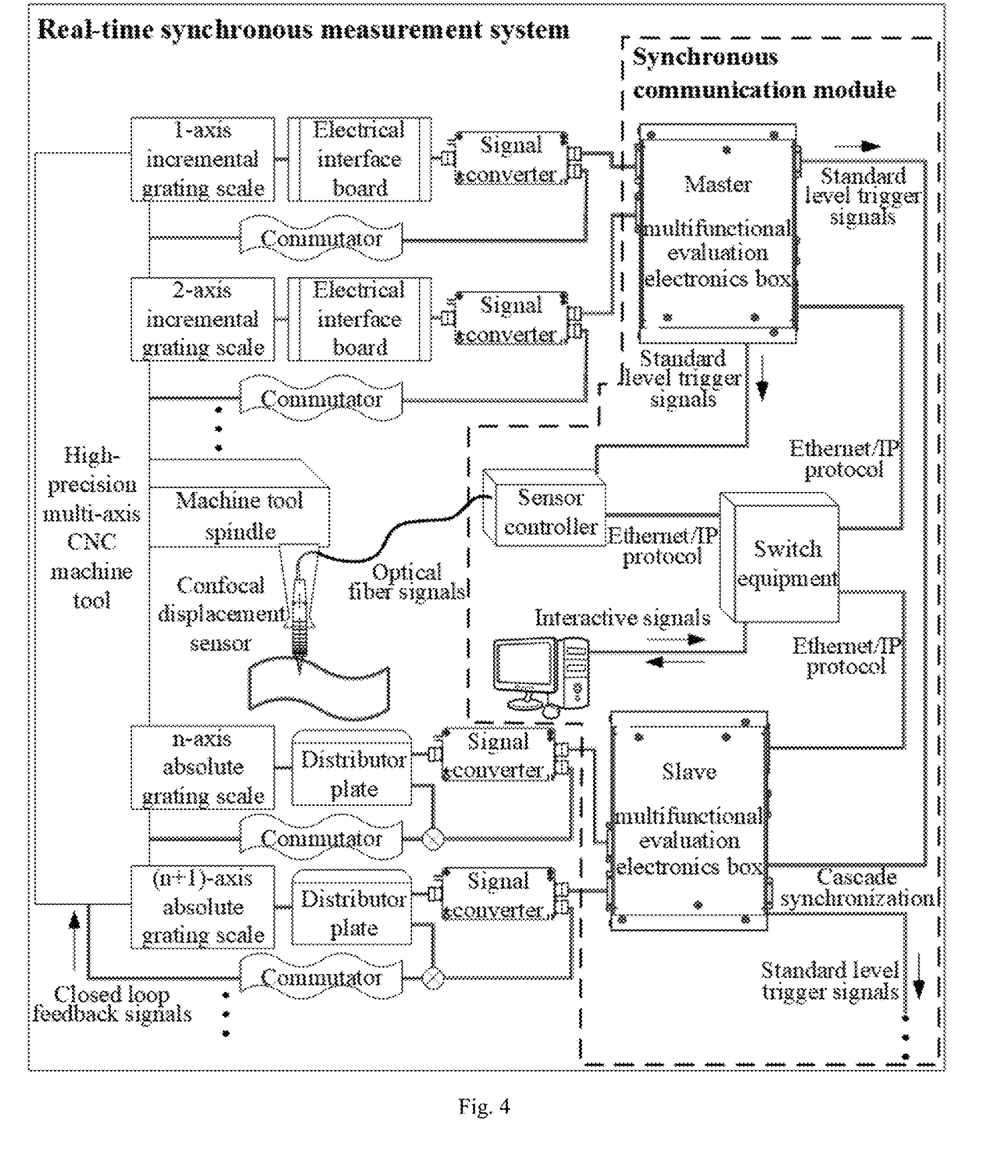
FIG. 4 is an architectural diagram of an on-machine real-time measurement system of the present invention.

As shown in FIG. 4, the grating scale of each machine axis is connected with the Heidenhain signal converter, and the Heidenhain signal converter provides real-time feedback of the grating scale signals to the golding CNC system and the Heidenhain multifunctional evaluation electronics box to ensure the full-closed loop high-precision control of the five-axis CNC machine tool. The translational axis grating scale of the five-axis CNC machine tool is the incremental grating scale, two channels of incremental signals are output directly through connection of an electrical interface board and the Heidenhain signal converter; and the rotational axis grating scale of the five-axis CNC machine tool is the absolute grating scale, the absolute grating scale signals are divided into absolute signals and incremental signals by a distributor plate firstly, and then the incremental signals are duplicated into two channels of identical incremental signals through the electrical interface board and the Heidenhain signal converter. One channel of incremental signal is merged with the absolute signals to feedback the position data to the CNC system to form a full-closed loop, and the other channel of incremental signal is transmitted to the Heidenhain multifunctional evaluation electronics box for data collection. The Heidenhain multifunctional evaluation electronics box synchronously reads the grating scale signals on the full-closed loop five-axis CNC machine tool in real time, and synchronously triggers the non-contact displacement sensor in real time to collect the surface information of the measured workpiece. The grating scale signals of each axis include position signals and timestamp index signals, and the measurement signals of the sensor include light intensity signals, thickness signals, distance signals and trigger index signals.

Figure 5:
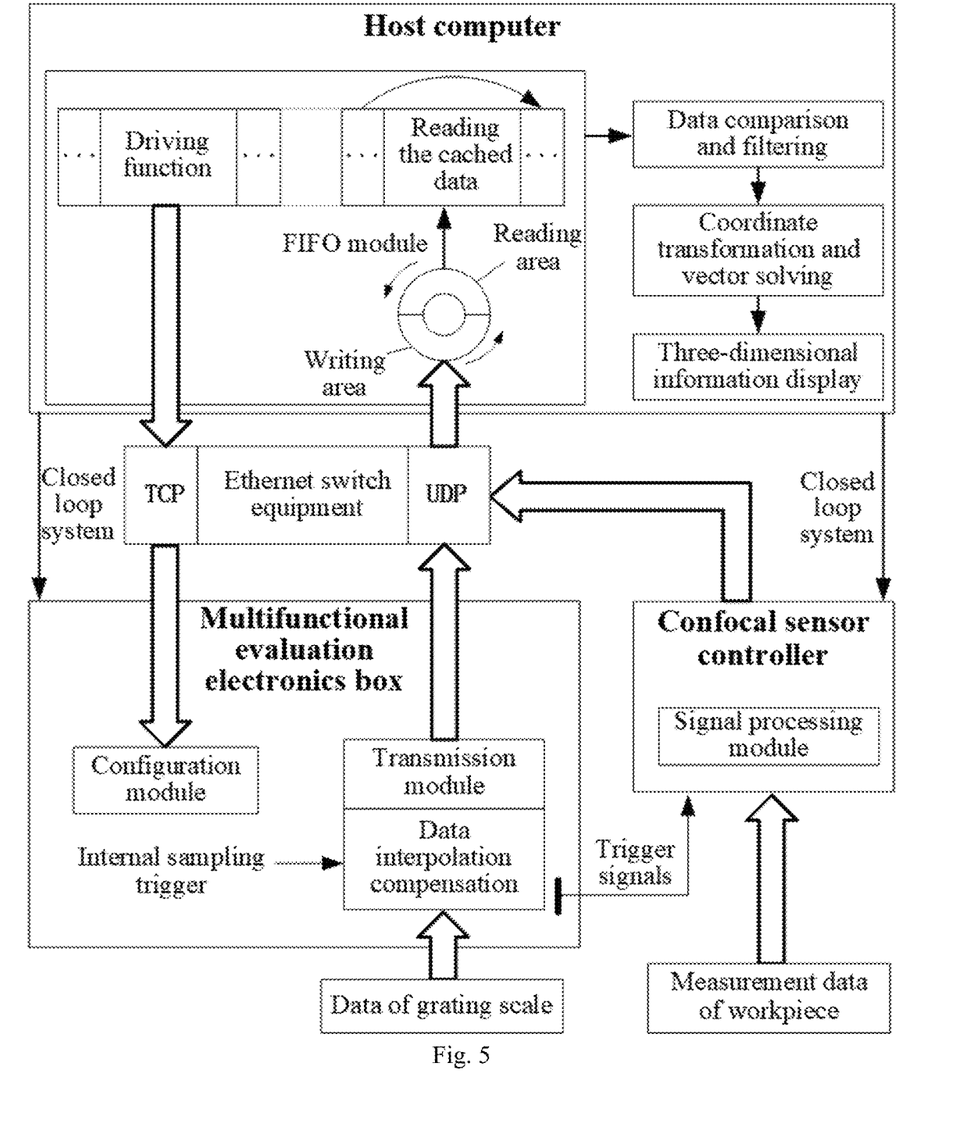
FIG. 5 is a control flowchart of a real-time synchronous communication module of FIG. 4.

The synchronous communication module shown in FIG. 5 caches data packets of the grating scale signals of each axis and the measurement signals of the sensor to the FIFO module of the host computer in real time and concurrently based on a local area network (LAN) through connection of Ethernet switch equipment so as to reduce the burden of high-speed transmission; and the host computer circularly reads the data in the FIFO module, and synchronously sends data confirmation information to the Heidenhain multifunctional evaluation electronics box and the confocal displacement sensor, so as to form a closed loop of information to ensure one-to-one correspondence between the position of each machine axis and the measurement data. On this basis, the host computer performs data processing and coordinate transformation of the grating scale data of each axis and the measurement information, and finally obtains the three-dimensional geometric information of the measured workpiece surface.

Figure 6:
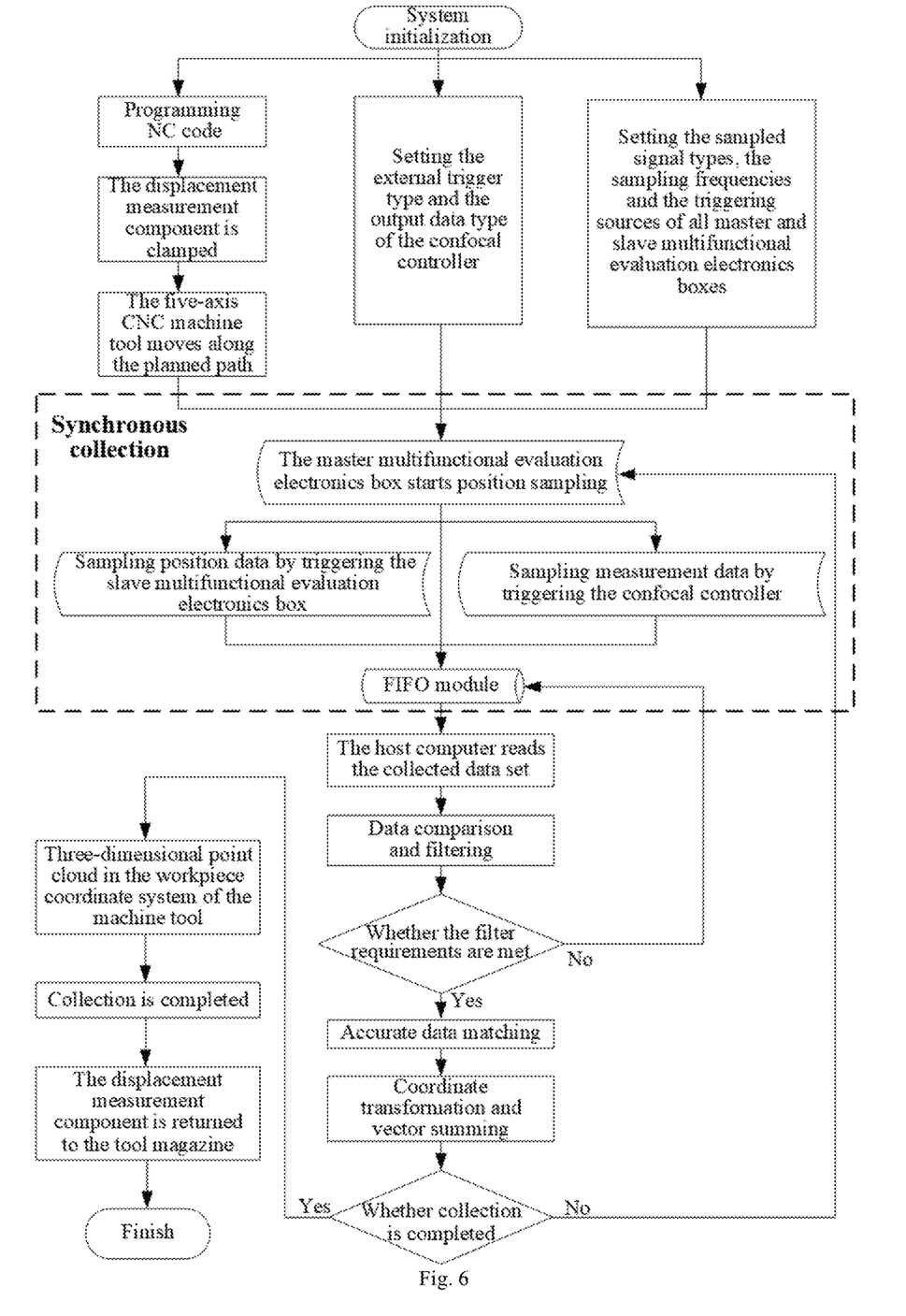
FIG. 6 is a program flowchart of an on-machine real-time measurement method for a full-closed loop five-axis CNC machine tool.

Combined with the above on-machine real-time measurement system, an on-machine real-time measurement method for a full-closed loop five-axis CNC machine tool is proposed, and the on-machine real-time synchronous measurement process thereof is shown in FIG. 6, comprising the following specific steps:

S1: Using the host computer to set the triggered confocal displacement sensor to be triggered by the rising edge of the external pulse, and setting the types of output signals to light intensity signals, thickness signals, distance signals and trigger index time; setting the master Heidenhain multifunctional evaluation electronics box to a real-time communication mode, the sampled signal type to 1 Vpp sinusoidal signals, the sampling frequency to 1 kHz, the triggering source to internal trigger, and the types of output signals to position signals of the grating scale and timestamp index signals; and switching from the triggering source of the Heidenhain multifunctional evaluation electronics box to external trigger.

Figure 2:
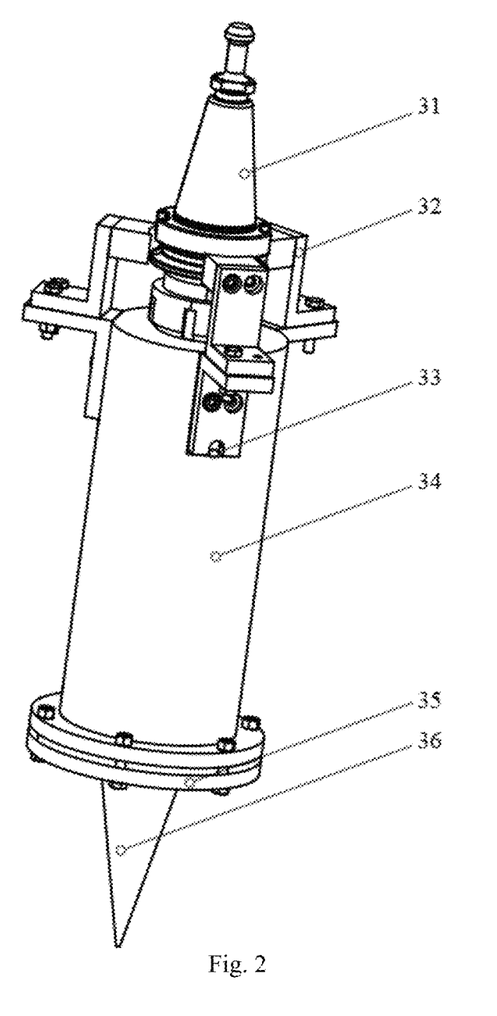
FIG. 2 is a schematic diagram of the overall structure of a displacement measurement component.
Figure 3:
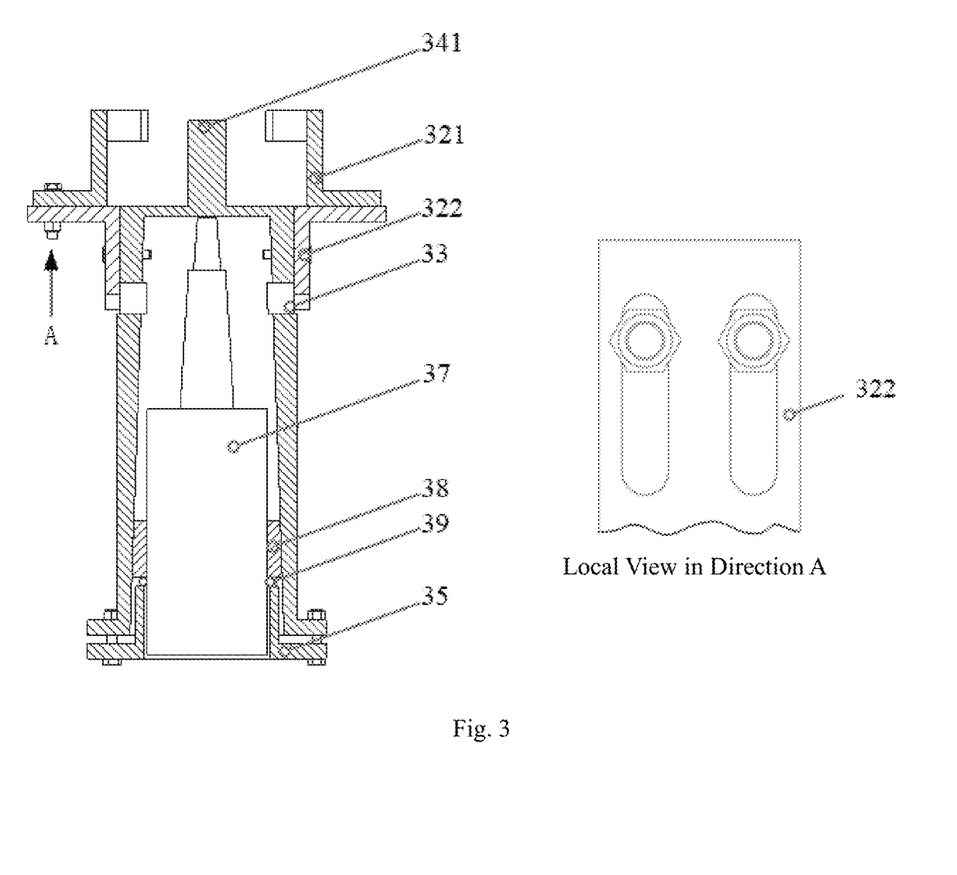
FIG. 3 is a front sectional view and local view of FIG. 2.

S2. Planning a measurement path that maintains the axis direction of the laser beam 36 is the same as the normal direction of the workpiece surface to improve the accuracy of the measurement data. On this basis, generating and importing the numerical control (NC) code into the CNC system. And then installing the displacement measurement component on the machine tool spindle 2. Ultimately, preparing the whole scanning of the measured workpiece.

S3. Importing the corresponding header files and dll dynamic-link libraries of the confocal sensor controller and the Heidenhain multifunctional evaluation electronics box into the C++ program of the host computer, and setting the C++ program to circularly read data sets of the grating scale signals and the measurement signals in the FIFO rotation buffering module of the host computer, so as to carry out data comparison and data filtering. The method for data comparison and data filtering is as follows: firstly, the timestamp index of the grating scale signals of each axis is compared with the trigger index of the sensor signals, and removing the axis grating ruler signals and their corresponding sensor measurement signals where the time difference exceeds the sampling period according to the data comparison result; and then the light intensity signals of the sensor are filtered, and deleting sensor measurement signals and their corresponding axis grating ruler signals that fall beyond the light intensity range The sampling period is set to 1 ms, and the available range of light intensity signals is set to 5%-95%.

S4. According to the results of data comparison and data filtering, synthesizing the position data in the grating scale signals of each axis and the displacement data in the measurement signals of the sensor in the following ways, so as to obtain the geometric information of the measuring point on the measured workpiece surface:

$$p^w = J_m^{-1}((d \Box R_q^t + N_q^t) + T_m)$$

wherein $p^w = [x_p^w \ y_p^w \ z_p^w]^T$ represents the coordinate information of the measuring point on the measured workpiece surface in the workpiece coordinate system, d is the distance signal of the non-contact displacement sensor or the sum of the distance signal and the thickness signal, $N_q^t$ is the relative coordinate $[x_q^t \ y_q^t \ z_q^t]^T$ of the optical zero-point q of the non-contact displacement sensor corresponding to the measuring point relative to the base point of the tool movement axis of the full-closed loop five-axis CNC machine tool, k is the light extraction vector $[i_q^t \ j_q^t \ k_q^t]^T$ of the non-contact displacement sensor corresponding to the measuring point, $T_m$ is a translation matrix $[X \ Y \ Z]^T$ composed of grating scale position signals of X, Y and Z axes on the five-axis CNC machine tool, and $J_m^{-1}$ is an inverse Jacobian rotation matrix composed of position signals of the grating scales of A and C axes of the five-axis CNC machine tool.

The coordinate formula of the measuring point in the workpiece coordinate system of the cradle-type five-axis CNC machine tool is:

$$\begin{bmatrix} x_p^w \\ y_p^w \\ z_p^w \end{bmatrix} = \begin{bmatrix} \cos(C) & \sin(C) & 0 \\ -\cos(A)\sin(C) & \cos(A)\cos(C) & \sin(A) \\ \sin(A)\sin(C) & -\cos(C)\sin(A) & \cos(A) \end{bmatrix}^{-1} \left( \begin{bmatrix} d\Box i_q^t + x_q^t \\ d\Box j_q^t + y_q^t \\ d\Box k_q^t + z_q^t \end{bmatrix} + \begin{bmatrix} X \\ Y \\ Z \end{bmatrix} \right)$$

S5. Repeating steps S3 and S4 until the end of scanning, and finally obtaining the three-dimensional geometric information of the surface of the measured workpiece.

S6. Upon completion of the measurement, automatically returning the displacement measurement component 3 to the tool magazine 4 in cooperation with the NC program.

S7. Installing the milling cutter 5 on the full-closed loop five-axis CNC machine tool through the tool magazine 4, and carrying out subsequent milling according to the three-dimensional geometric information of the measured workpiece surface calculated from the measurement data.

The invention claimed is:

1. An on-machine real-time measurement method for a full-closed loop five-axis computer numerical control (CNC) machine tool, wherein an on-machine real-time measurement system comprises a displacement measurement component, signal converters, multifunctional evaluation electronics boxes, grating scales, a synchronous communication module and a host computer, wherein:

the displacement measurement component comprises a non-contact displacement sensor and a high-precision coaxial fixture for measuring position points on a workpiece surface, which is installed on a CNC machine tool spindle during a workpiece measurement and is automatically placed in a tool magazine under an action of a tool changer in the full-closed loop five-axis CNC machine tool;

the grating scales on the full-closed loop five-axis CNC machine tool is connected to the signal converters, and the signal converters route grating scale position signals in real time to the CNC measurement system and the multifunctional evaluation electronics box used for detection;

the multifunctional evaluation electronics box synchronously reads the position signals of the grating scales on the full-closed loop five-axis CNC machine tool in real time, and simultaneously triggers the non-contact displacement sensor in real time to collect a surface information of the measured workpiece, wherein the grating scale position signals of each machine axis include position signals and timestamp index signals of each axis, and measurement signals of the sensor include light intensity signals, displacement signals and trigger index signals;

the synchronous communication module caches data packets of the grating scale position signals and the measurement signals of the sensor to a first in first out (FIFO) rotation buffering module of the host computer through transmission control protocol/internet protocol (TCP/IP) in real time and concurrently to reduce a burden of high-speed transmission; the host computer reads the data in the FIFO rotation buffering module and synchronously sends data confirmation information to the multifunctional evaluation electronics box and the non-contact displacement sensor, so as to form a closed loop of information to ensure one-to-one correspondence between the position of each machine axis and the measurement signal measurement data; and on this basis, the host computer performs data processing and coordinate transformation of the grating scale position signals and the measurement data, and finally obtains a three-dimensional geometric information of the measured workpiece surface;

the measurement method comprises the following specific steps:

S1: setting an external trigger type, an output data type and a trigger index time of the non-contact displacement sensor through the host computer, and setting an operation mode, a sampled signal type, a sampling frequency and a triggering source of the multifunctional evaluation electronics box;

S2: planning a measurement path that maintains an axis direction of the machine tool spindle is the same as a normal direction of the workpiece surface; and generating and importing numerical control (NC) code into the CNC measurement system; and then installing the displacement measurement component on the machine tool spindle; preparing the measured workpiece is to be scanned in whole;

S3: setting the host computer to read data sets of the grating scale position signals of each axis and the measurement signals of the sensor in the FIFO rotation buffering module, and carrying out data comparison and data filtering;

S4: according to the results of data comparison and data filtering, synthesizing the position data in the grating scale position signals of each axis and a displacement data in the measurement signals of the sensor in a following ways, so as to obtain the three dimensional geometric information of a measuring point p on the measured workpiece surface:

$$P^w = J_m^{-1}((d \cdot R_q^t + N_q^t) + T_m)$$

wherein $p^w = [x_p^w\ y_p^w\ z_p^w]^T$ represents a coordinate information of the measuring point p on the measured workpiece surface in a workpiece w coordinate system x y z, T indicates a vector transpose operation, d is a distance signal of the non-contact displacement sensor or a sum of the distance signal and a thickness signal, $N_q^t$ is a relative coordinate $[x_q^t\ y_q^t\ z_q^t]$ of an optical zero-point q of the non-contact displacement sensor corresponding to a measuring point relative to a base point of a tool movement t axis of the full-closed loop five-axis CNC machine tool, $R_q^t$ is a light extraction vector $[i_q^t\ j_q^t\ k_q^t]^T$ of the non-contact displacement sensor corresponding to the measuring point relative to the base point of the tool movement t axis of the full-closed loop five-axis CNC machine tool, where i j k are coordinates of the light extraction vector on the workpiece coordinate system x y z, $T_m$ is a translation matrix composed of the position signals of the grating scale of each axis of the full-closed loop five-axis CNC machine tool, and $J_m^{-1}$ is an inverse Jacobian rotation matrix composed of the grating scale position signals of each axis of the full-closed loop five-axis CNC machine tool;

S5: repeating steps S3 and S4 until an end of scanning, and finally obtaining the three-dimensional geometric information of the measured workpiece surface;

S6: upon completion of the workpiece measurement, automatically returning the displacement measurement component to the tool magazine.

2. The on-machine real-time measurement method for the full-closed loop five-axis CNC machine tool according to claim 1, wherein the non-contact displacement sensor is installed on the high-precision coaxial fixture, and a positioning element of the high-precision coaxial fixture is precisely matched with a clamping unit of the machine tool spindle to ensure coaxial clamping; and the non-contact displacement sensor is a non-contact detection sensor with a trigger function.

3. The on-machine real-time measurement method for the full-closed loop five-axis CNC machine tool according to claim 1, wherein when the grating scale as is an incremental grating scale, two channels of incremental signals are output directly through connection of an electrical interface board and the signal converter; and when the grating scale is an absolute grating scale, the absolute grating scale position signals are divided into absolute signals and incremental signals by a distributor plate firstly, and the incremental signals are duplicated into two channels of identical incremental signals through the electrical interface board and the signal converter, wherein one channel of incremental signal is merged with the absolute signals to feed back the position data to the CNC system to form a full-closed loop, and the other channel of incremental signal is transmitted to the multifunctional evaluation electronics box for data collection.

4. The on-machine real-time measurement method for the full-closed loop five-axis CNC machine tool according to claim 1, wherein the synchronous communication module realizes data transmission and exchange between devices based on a local area network (LAN);

the LAN is constructed through Ethernet switch equipment, wherein the non-contact displacement sensor transmits the measurement signals to the Ethernet switch equipment through Ethernet/internet protocol (Ethernet/IP), the multifunctional evaluation electronics box transmits the grating scale position signals of each axis to the Ethernet switch equipment through Ethernet/IP, and the host computer is connected with the Ethernet switch equipment as terminal equipment to perform data reading through the FIFO rotation buffering module;

the FIFO rotation buffering module caches continuous data streams based on a FIFO memory to relieve a burden of data reading and storage of the host computer.

5. The on-machine real-time measurement method for the full-closed loop five-axis CNC machine tool according to claim 2, wherein the non-contact displacement sensor is a triggered confocal displacement sensor, and a transmission mode of measurement signals of the triggered confocal displacement sensor is optical fiber transmission; and the measurement signals of the triggered confocal displacement sensor are synchronously triggered by the multifunctional evaluation electronics box through Recommended Standard 422 (RS422) signals.

6. The on-machine real-time measurement method for the full-closed loop five-axis CNC machine tool according to claim 1, wherein the multifunctional evaluation electronics box is divided into a master multifunctional evaluation electronics box and a slave multifunctional evaluation electronics box for reading and processing the grating scale position signals of the full-closed loop CNC machine tool, and data collection is triggered between the master multifunctional evaluation electronics box and the slave multifunctional evaluation electronics box through cascade synchronization.

7. The on-machine real-time measurement method for the full-closed loop five-axis CNC machine tool according to claim 1, wherein the method for data comparison and data filtering is as follows: firstly, the timestamp index of the grating scale position signals of each axis is compared with the trigger index of the sensor signals, and removing axis grating ruler signals and their corresponding sensor measurement signals where a time difference exceeds a sampling period according to the data comparison result; and then the light intensity signals of the sensor are filtered, and deleting the sensor measurement signals and their corresponding axis grating ruler signals that fall beyond a light intensity range.

8. The on-machine real-time measurement method for the full-closed loop five-axis CNC machine tool according to claim 1, wherein the sampled signals of the multifunctional evaluation electronics box are sinusoidal analog signals or transistor logic (TTL) signals; the sampling frequency is set to a range of 0.05-10 kHz; and when the non-contact displacement sensor is a triggered confocal displacement sensor, the range of light intensity signals is 5%-95%.

* * * * *